United States Patent [19]

Strack et al.

[11] Patent Number: 4,668,648
[45] Date of Patent: May 26, 1987

[54] MAGNESIUM-SILICATE BOUND ZEOLITE GRANULATES OF THE TYPE OF ZEOLITE A, PROCESS FOR THEIR PRODUCTION AND USE

[75] Inventors: Hans Strack, Alzenau; Peter Kleinschmit, Hanau, both of Fed. Rep. of Germany

[73] Assignee: Degussa Aktiengesellschaft, Frankfurt, Fed. Rep. of Germany

[21] Appl. No.: 827,926

[22] Filed: Feb. 10, 1986

Related U.S. Application Data

[63] Continuation of Ser. No. 597,286, Apr. 6, 1984, abandoned.

[30] Foreign Application Priority Data

Apr. 11, 1983 [DE] Fed. Rep. of Germany ....... 3312877

[51] Int. Cl.$^4$ ............................................ B01J 29/06
[52] U.S. Cl. ....................................... 502/64; 502/69
[58] Field of Search ................... 502/8, 9, 64, 69, 70, 502/60

[56] References Cited

U.S. PATENT DOCUMENTS

| | | | |
|---|---|---|---|
| 2,885,368 | 5/1959 | Hess et al. | 502/60 |
| 2,973,327 | 2/1961 | Mitchell et al. | 502/8 |
| 3,055,841 | 9/1962 | Gladrow et al. | 502/64 |
| 3,181,231 | 5/1965 | Breck | 502/60 |
| 3,291,754 | 12/1966 | Hanisch et al. | 502/60 |
| 3,377,295 | 4/1968 | Pryor | 502/64 |
| 3,382,187 | 5/1968 | Drost et al. | 502/64 |
| 3,624,003 | 11/1971 | Conde et al. | 502/64 |

*Primary Examiner*—Carl F. Dees
*Attorney, Agent, or Firm*—Beveridge, DeGrandi & Weilacher

[57] ABSTRACT

Magnesium-silicate bound zeolite granulates of type A are disclosed wherein the zeolite component does not contain magnesium exclusively, or contains no magnesium at all, as the cation. The granulates are produced by placing powdered zeolite A in a mixer, adding sodium silicate solution, mixing until zeolite granulates with a grain size of at least 0.1 mm are obtained, optionally after-rolling these zeolite granulates, optionally initially drying the moist zeolite granulates at temperatures of 20 to 39 degrees C., during which the carbon dioxide content of the drying air is adjusted to less than 200 ppm, then optionally drying in a second drying step at temperatures of 40–120 degrees C. and optionally in a third drying stage at 121–200 degrees C. under otherwise identical conditions, and then optionally activating the granulates thus obtained at temperatures of 600 degrees C. maximum. The granulates thus obtained are treated with an aqueous magnesium salt solution, washed, then optionally treated with aqueous metal salt solution, washed, dried at 40–200 degrees C., preferably 100 to 120 degrees C., and then optionally calcined at 300 to 650 degrees C.

42 Claims, No Drawings

MAGNESIUM-SILICATE BOUND ZEOLITE GRANULATES OF THE TYPE OF ZEOLITE A, PROCESS FOR THEIR PRODUCTION AND USE

REFERENCE TO RELATED APPLICATION

This is a continuation of our copending application Ser. No. 597,286 filed Apr. 6, 1984, now abandoned, which is relied on and incorporated by reference.

The invention relates to new magnesium-silicate bound zeolite granulates of the type of zeolite A, the process for their production, and their use as adsorption agents.

It is known to produce magnesium-silicate bound zeolite granulates with the use of sodium silicate solution, by forming crystalline zeolite NaA with an alkali silicate in which the ratio $Me_2O:SiO_2$ is 1:3 to 1:5 and the formed product is then dried at temperatures between 40 and 280 degrees C. to a residual moisture content of 0 to 35 wgt. percent, then treated with a 0.5 to 35 percent magnesium salt solution for up to complete ion exchange in the zeolite and conversion of the alkali silicate to magnesium silicate, the formed bodies are freed of adhering salt solution by washing with water, and are finally activated at temperatures above 200 degrees C.

The magnesium-silicate bound zeolite granulates produced in this way are characterized by the fact that the alkali metals contained in the starting mixture have been completely replaced by magnesium in the zeolite granulates. The products produced by the known process have an apparent pore diameter of 3 Angstroms and, except for water and ammonia, do not take up any of the industrially used gases (German DAS No. 1,567,588).

The object of the invention is to produce magnesium-silicate bound zeolite granulates which, in addition to water and ammonia, can also adsorb other molecules.

The feature of the invention resides in magnesium-silicate bound zeolite granulates of the type A, which are characterized by the fact that the zeolite component does not contain magnesium exclusively, or contains no magnesium at all, as the cation.

The process for the production of the magnesium-silicate bound zeolite granulates comprises placing powdered zeolite A in a mixer, adding sodium silicate solution and carrying out mixing until zeolite granulates with a grain size of at least 0.1 mm are obtained, these zeolite granulates are optionally after-rolled, the moist zeolite granulates are optionally initially dried at temperatures of 20 to 39 degrees C., during which the carbon dioxide content of the drying air is adjusted to less than 200 ppm, are then optionally dried in a second drying step at temperatures of 40 to 120 degrees C. and optionally in a third drying stage at 121-200 degrees C. under otherwise identical conditions, and the zeolite granulates thus obtained are then optionally activated at temperatures of 600 degrees C. maximum. The zeolite granulates thus obtained are treated with an aqueous magnesium salt solution, washed, then optionally treated with aqueous metal salt solution, washed, dried at 40 to 200 degrees C., preferably 100 to 120 degrees C., and then optionally calcined at 300 to 650 degrees C.

In an embodiment of the invention, the magnesium-silicate bound zeolite granulates of the type of zeolite A can be characterized by the fact that they contain a magnesium-sodium zeolite A as the zeolite component A, show the following adsorption data and have a kinetic index for water of at least 0.8.

| Molecule | Weight Percent | Temp. Degrees C. | Adsorption time min. | Partial Press. | Spec. loading/ l/min g* |
|---|---|---|---|---|---|
| $H_2O$ | 22 | 20 | 30 | 20 | 0.8 |
| $NH_3$ | 10 | 20 | 30 | 620 | 0.85 |
| $CH_3OH$ | 15 | 20 | 30 | 150 | 1.0 |
| $CO_2$ | 8 | 20 | 30 | 150 | 1.0 |
| n-Hexane | 4 | 20 | 30 | 580 | 1.1 |

*(the adsorbed gas is diluted with carrier air, indicated in liters gas mixture per minute and per gram zeolite).

The kinetic index is the quotient of the load for 30 minutes and for 600 minutes.

These magnesium-silicate bound zeolite granulates can be produced by placing powdered zeolite A in a mixer, adding sodium silicate solution, mixing until zeolite granulates with a grain size of at least 0.1 mm are obtained, optionally after-rolling these zeolite granulates, optionally initially drying the moist zeolite granulates at temperatures of 20 to 39 degrees C., during which the carbon dioxide content of the drying air is adjusted to less than 200 ppm, then optionally drying in a second drying step at temperatures of 40-120 degrees C. and optionally in a third drying stage at 121-200 degrees C. under otherwise identical conditions, and then optionally activating the zeolite granulates thus obtained at temperatures of 600 degrees C. maximum, and treating the zeolite granulates thus obtained with an aqueous magnesium salt solution, washing, drying at 40 to 200 degrees C., preferably at 100 to 120 degrees C., and then optionally calcining at 300 to 600 degrees C., preferably 400 to 450 degrees C.

In a further embodiment, the magnesium-silicate bound zeolite granulates of the type of zeolite A can contain a potassium zeolite A as the zeolite component, show the following adsorption data and have a kinetic index for water of at least 0.7.

| Molecule | Weight Percent | Temp. Degrees C. | Adsorption time min. | Partial Press. | Spec. loading/ l/min g* |
|---|---|---|---|---|---|
| $H_2O$ | 21 | 20 | 30 | 20 | 0.8 |
| $NH_3$ | 7 | 20 | 30 | 620 | 0.85 |
| $CH_2$—OH | 6 | 20 | 30 | 150 | 1.0 |
| $CO_2$ | 2 | 20 | 30 | 150 | 1.0 |
| n-Hexane | 3 | 20 | 30 | 580 | 1.1 |

*(the adsorbed gas is diluted with carrier air, indicated in liters gas mixture per minute and per gram zeolite).

These magnesium-silicate bound zeolite granulates can be produced by placing powdered zeolite A in a mixer, adding sodium silicate solution, mixing until zeolite granulates with a grain size of at least 0.1 mm are obtained, optionally after-rolling these zeolite granulates, initially drying the moist zeolite granulates at temperatures of 20 to 39 degrees C., during which the carbon dioxide content of the drying air is adjusted to less than 200 ppm, then optionally drying in a second drying step at temperatures of 40-120 degrees C. and optionally in a third drying stage at 121-200 degrees C. under otherwise identical conditions, and then optionally activating the zeolite granulates thus obtained at temperatures of 600 degrees C. maximum, and treating the zeolite granulates thus obtained with an aqueous magnesium salt solution, washing, then treating with an aqueous potassium salt solution, washing, drying at 40 to 200 degrees C., preferably 100 to 120 degrees C., and then optionally calcining at 300 to 550 degrees C., preferably 350 to 450 degrees C.

The magnesium-silicate bound zeolite granulates of the type of zeolite A according to the invention can contain a sodium zeolite A as the zeolite component, show the following adsorption data and have a kinetic index of at least 0.8.

| Molecule | Weight Percent | Temp. Degrees C. | Adsorption time min. | Partial Press. | Spec. loading l/min g* |
|---|---|---|---|---|---|
| $H_2O =$ | 24 | 20 | 30 | 20 | 0.8 |
| $NH_3 =$ | 10 | 230 | 3 | 620 | 0.85 |
| $CH_3-OH =$ | 15 | 20 | 30 | 150 | 1.0 |
| $CO_2 =$ | 10 | 20 | 30 | 150 | 1.0 |
| n-Hexane = | 4 | 20 | 30 | 580 | 1.1 |

*(the adsorbed gas is diluted with carrier air, indicated in liters gas mixture per minute and per gram zeolite).

These magnesium-silicate bound zeolite granulates can be produced by placing powdered zeolite A in a mixer, adding sodium silicate solution, mixing until a zeolite granulate with a grain size of at least 0.1 mm is obtained, optionally after-rolling these zeolite granulates, initially drying the moist zeolite granulates at temperatures of 20 to 39 degrees C., during which the carbon dioxide content of the drying air is adjusted to less than 200 ppm, then optionally drying in a second drying step at temperatures of 40–120 degrees C. and optionally in a third drying stage at 121–200 degrees C. under otherwise identical conditions, and then optionally activating the zeolite granulates thus obtained at temperatures of 600 degrees C. maximum, and treating the zeolite granulates thus obtained with an aqueous magnesium salt solution, washing, then treating with an aqueous sodium salt solution, washing, drying at 40 to 200 degrees C., preferably 100 to 120 degrees C., and then optionally calcining at 300 to 600 degrees C., preferably 400 to 500 degrees C.

In a further embodiment, the magnesium-silicate bound zeolite granulates of the type of zeolite A can contain a calcium zeolite A as the zeolite component, show the following adsorption data and have a kinetic index of at least 0.8.

| Molecule | Weight Percent | Temp. Degrees C. | Adsorption time min. | Partial Press. | Spec. loading l/min g* |
|---|---|---|---|---|---|
| $H_2O =$ | 22 | 20 | 30 | 20 | 0.8 |
| $NH_3 =$ | 10 | 20 | 30 | 620 | 0.85 |
| $CH_3-OH =$ | 15 | 20 | 30 | 150 | 1.0 |
| $CO_2 =$ | 14 | 20 | 30 | 150 | 1.0 |
| n-Hexane = | 12 | 20 | 30 | 580 | 1.1 |

*(the adsorbed gas is diluted with carrier air, indicated in liters gas mixture per minute and per gram zeolite).

These magnesium-silicate bound zeolite granulates can be produced by placing powdered zeolite A in a mixer, adding sodium silicate solution, mixing until zeolite granulates with a grain size of at least 0.1 mm are obtained, optionally after-rolling these zeolite granulates, initially drying the moist zeolite granulates at temperatures of 20 to 39 degrees C., during which the carbon dioxide content of the drying air is adjusted to less than 200 ppm, then optionally drying in a second drying step at temperatures of 40–120 degrees C. and optionally in a third drying stage at 121–200 degrees C. under otherwise identical conditions, and then optionally activating the zeolite granulates thus obtained at temperatures of 600 degrees C. maximum, and treating the zeolite granulates thus obtained with an aqueous magnesium salt solution, washing, then treating with an aqueous calcium salt solution, washing, drying at 40 to 200 degrees C., preferably 100 to 120 C., and then optionally calcining at 300 to 650 degrees C., preferably 450 to 600 degrees C.

A powdered zeolite which has been produced according to German OLS Nos. 24 47 021, 25 17 218, 26 51 419, 26 51 420, 26 51 436, 26 51 437, 26 51 445 and/or 26 51 485 and shows the particle size distribution indicated there can be used as the zeolite A.

A zeolite powder of type A according to German OLS No. 26 51 485 is preferably used.

The water content of the zeolite can amount to 0.1–27 percent, preferably 15 to 22 percent.

The zeolite powders are preferably used in their sodium form. The sodium silicate solution preferably has a modulus $SiO_2:Na_2O$ of 1.0 to 3.4, an $Na_2O$ content of 2–20 wgt percent, and an $SiO_2$ content of 5–31 wgt percent.

The mixture of zeolite A and sodium silicate can contain the components in the ratio of 1.2 plus or minus 0.2 $Na_2O:Al_2O_3:2.4$ plus or minus 0.4 $SiO_2:12$ plus or minus 3 $H_2O$.

Commercial mixers, preferably containing a spraying device, such as plowshare mixers, screw mixers, mixing granulators, and the like can be used as mixers. A known unit, such as a granulating tray, coating drum, and the like can be used as an after-rolling device. In this case, a mechanical compaction and rounding-off of the granulate and a narrowing of the grain size distribution are achieved.

The drying of the zeolite granulate can be carried out continuously or discontinuously in known equipment, such as drying cabinets, belt dryers, or fluidized bed dryers. A fluidized bed dryer is preferably used, because, in this case, a dedusting of the granulate is simultaneously achieved. The exhaust air of the drying step can be recycled, with the exhaust drying air being mixed with the corresponding quanity of fresh air to adjust the carbon dioxide content of less than 200 ppm.

The drying can be carried out equally well in an inert gas stream, such as nitrogen, i.e., the presence of carbon dioxide is not necessary.

The drying gas can have a partial water vapor pressure of 0.01 torr to 750 torr, preferably 0.1 to 400 torr, in which case the partial pressure of the water vapor in the drying gas must be below the saturation pressure at the corresponding drying temperature.

This is optionally followed by a screening with known screening devices, in which case the screening can be carried out optionally on moist or dried granulate. In the case of moist screening, a mechanical destruction of the granulate must be avoided, but, in this case, the outsize particles (oversize and undersize particles) can be easily mechanically comminuted and returned to the granulation process. The dried zeolite granulate can be activated continuously or discontinuously at temperatures of 300 to 500 degrees C., maximum 600 degrees C., in known equipment, such as muffle furnaces, rotary kilns, tubular furnaces, or the like. The treatment of the zeolite granulates with magnesium salt solutions can be carried out in known equipment, such as, for example, exchanger columns. The treatment temperature can be 5 to 100 degrees C., preferably 40 to 90 degrees C. The concentration of the magnesium salt solution can be 0.01 to 10 molar, preferably 0.1 to 3 molar. The chloride, sulfate, and nitrate can be used as the magnesium salt. Any suitable salt form may be used for purposes of the invention. The exchange time can be 1 minute to 6 hours, preferably 30 minutes to 3 hours. It is important in this case that the sodium ions of the binder are completely exchanged against magnesium ions. A complete exchange of the sodium ions in the zeolite is prevented by the fact that the already exchanged sodium ions are left in the magnesium salt solution, which is preferably recirculated by pumping during the treatment. After the subsequent washing with water, the treatment with metal salt solutions can be carried out.

Those metal salts whose cations are capable of penetrating into the structure of the zeolite are suitable for the treatment of the zeolite granulates with metal salt solutions.

In addition to potassium, sodium, or calcium ions, $Ba^{2+}$, $Zn^{2+}$, $Ag^+$, and other cations can also be used. Typical salts are chlorides, sulfates, nitrates and the like. Any suitable form may be used for purposes of the invention.

The treatment of the magnesium-silicate bound zeolite granulates with metal salt solution can be carried out in known equipment such as, for example, exchanger columns. The treatment with metal salt solution is preferably then carried out in the same equipment in which the treatment with magnesium salt solution was carried out.

The treatment temperature can be 5 to 100 degrees C., preferably 40 to 90 degrees C. The concentration of the metal salt solution can be 0.01 to 10 molar, preferably 0.1 to 3 molar.

The zeolite granulates according to the invention, in that case, after completion of the treatment with aqueous metal salt solutions, show a content of sodium ions. This sodium ion content is restricted to the zeolite component of the zeolite granulate, while the binder is free of sodium ions. On the basis of the production process according to the invention, the silicate binder is not a zeolite.

The magnesium-silicate bound zeolite granulates according to the invention can be used with great advantage as adsorption agents in gaseous and liquid systems. They can absorb the following molecules, among others: $H_2O$, $NH_3$, $CH_3OH$, $C_2$, and n-hexane.

Thus, for example, pipe and cigarette filters can be equipped with these granulates. Another area of application is the drying of organic solvents.

EXAMPLE 1

Production of the Starting Compound 100 kg of zeolite A (German OLS 26 51 485, 21 percent water content) is placed in a screw mixer. 49 kg of water glass (modulus 3.38; $Na_2O=4.8$ wgt percent; $SiO_2=15.7$ wgt percent) is sprayed into this. Zeolite granulates with a grain size of 0.1 to 3 mm are obtained, which are then after-rolled in a granulating tray. In this way, a narrower grain spectrum (0.3–2.5 mm) is obtained. The zeolite granulates are screened into grain fractions below 1 mm, 1–2 mm, and greater than 2 mm in the moist state. The grain fraction 1–2 mm is processed further under the designation Example 1A as indicated below. The grain fraction 1–2 mm (Example 1A) is dried in a fluidized bed dryer at 35 degrees C. In this process, part of the exhaust air is recycyled, so that the $CO_2$ content of the air is 150 ppm. The partial water vapor pressure is 21 mm. The zeolite granulates obtained in this way are processed further under the designation 1B as indicated below.

The granulates according to Example 1B are activated in a rotary kiln at 420 degrees C. The zeolite granulates obtained in this way are processed further under the designation Example 1C as indicated below. They showed the following adsorption properties:

TABLE 1a

| Molecule | Weight Percent | Temp. Degrees C. | Adsorption time min. | Partial Press. | Spec. loading l/min g* |
|---|---|---|---|---|---|
| $H_2O$ | 16.2 | 20 | 30 | 20 | 0.8 |
| $NH_3$ | 7.5 | 20 | 30 | 620 | 0.85 |
| $CH_3OH$ | 1.1 | 20 | 30 | 150 | 1.0 |
| $n-C_6H_{14}$ | 0.3 | 20 | 30 | 150 | 1.0 |
| $CO_2$ | 2.0 | 20 | 30 | 580 | 1.1 |

*(the adsorbed gas is diluted with carrier air, indicated in liters gas mixture per minute and per gram zeolite).

The kinetics of the water uptake are shown in Table 1b:

TABLE 1b

| Adsorption time min. | 10 | 20 | 30 | 60 | 120 | 600+ |
|---|---|---|---|---|---|---|
| Water uptake percent | 8.1 | 13.3 | 16.2 | 19.6 | 20.6 | 23.4 |

+Saturation

The kinetic index has a value of 0.69.

EXAMPLE 2

Production of Magnesium-Silicate Bound Granulates in the Magnesium-Sodium Form 18.5 kg of moist zeolite granulates according to Example 1A are placed in a column of a length of 1 meter, diameter of 0.2 meter, which is filled with a 0.5 M magnesium chloride solution. The exchanger column is connected in circuit with a heatable storage container. The total volume of the solution is 20 liters. The solution is recycled for three hours at room temperatures and then for two hours at 60 degrees C. The zeolite granulates are then washed with water until the conductivity in the wash water is below 500 $\mu$S. The drying is carried out at 110 degrees C. in a drying cabinet and the subsequent activation at 400 degrees C. in a muffle furnace. The product shows the following adsorption properties:

TABLE 2a

| Molecule | Weight Percent | Temp. Degrees C. | Adsorption time min. | Partial Press. | Spec. loading l/min g* |
|---|---|---|---|---|---|
| $H_2O$ | 25.9 | 20 | 30 | 20 | 0.8 |
| $NH_3$ | 14.4 | 20 | 30 | 620 | 0.85 |
| $CH_3OH$ | 18.4 | 20 | 30 | 150 | 1.0 |
| $n-C_6H_{14}$ | 4.0 | 20 | 30 | 150 | 1.0 |
| $CO_2$ | 13.9 | 20 | 30 | 580 | 1.1 |

*(the adsorbed gas is diluted with carrier air, indicated in liters gas mixture per minute and per gram zeolite).

The kinetics of the water uptake are shown in Table 2b.

TABLE 2b

| Adsorption time min. | 10 | 20 | 30 | 60 | 120 | 600+ |
|---|---|---|---|---|---|---|
| Water uptake percent | 15.4 | 24.0 | 25.9 | 26.3 | 26.4 | 26.4 |

+Saturation

The kinetic index has a value of 0.98.
Conditions as indicated in Table 2a.

EXAMPLE 3

Production of Magnesium-Silicate Bound Zeolite Granulates in the Mg-Na Form 16.3 kg of dried zeolite granulates according to Example 1B are treated as described in Example 2. They showed the following adsorption properties:

TABLE 3a

| Molecule | Weight Percent | Temp. Degrees C. | Adsorption time min. | Partial Press. | Spec. loading l/min g* |
|---|---|---|---|---|---|
| $H_2O$ | 25.7 | 20 | 30 | 20 | 0.8 |
| $NH_3$ | 14.3 | 20 | 30 | 620 | 0.85 |
| $CH_3OH$ | 20.2 | 20 | 30 | 150 | 1.0 |
| $n-C_6H_{14}$ | 3.6 | 20 | 30 | 150 | 1.0 |
| $CO_2$ | 14.5 | 20 | 30 | 580 | 1.1 |

*(the adsorbed gas is diluted with carrier air, indicated in liters gas mixture per minute and per gram zeolite).

TABLE 3b

| Adsorption time | min | 10 | 20 | 30 | 60 | 120 | 600+ |
|---|---|---|---|---|---|---|---|
| Water Uptake | percent | 12.4 | 22.3 | 25.7 | 26.9 | 26.9 | 26.9 |

+Saturation

The kinetic index has a value of 0.96.
Conditions as indicated in Table 3a.

EXAMPLE 4

Production of Magnesium-Silicate Bound Zeolite Granulates in the Magnesium-Sodium Form 550 kg of activated zeolite granulates according to Example 1C are added to 1000 liters of a 0.3 molar magnesium chloride solution in a 2 cubic meter vessel. The solution is recirculated by pumping for 3 hours at 80 degrees C. The zeolite granulates are then washed with water until the conductivity in the wash water is below 500 µS.

The zeolite granulates are dried in a drying cabinet at 110 degrees C. and are then activated in a rotary kiln at 500 degrees C. They show the following adsorption properties:

TABLE 4a

| Molecule | Weight Percent | Temp. Degrees C. | Adsorption time min. | Partial Press. | Spec. loading l/min g* |
|---|---|---|---|---|---|
| $H_2O$ | 23.6 | 20 | 30 | 20 | 0.8 |
| $NH_3$ | 11.7 | 20 | 30 | 620 | 0.85 |
| $CH_3OH$ | 15.7 | 20 | 30 | 150 | 1.0 |
| $n-C_6H_{14}$ | 2.7 | 20 | 30 | 150 | 1.0 |
| $CO_2$ | 8.4 | 20 | 30 | 580 | 1.1 |

*(the adsorbed gas is diluted with carrier air, indicated in liters gas mixture per minute and per gram zeolite).

The kinetics of the water uptake are shown in Table 4b.

TABLE 4b

| Adsorption time | min | 10 | 20 | 30 | 60 | 120 | 600+ |
|---|---|---|---|---|---|---|---|
| Water uptake | percent | 11.8 | 19.8 | 23.7 | 25.0 | 25.1 | 25.1 |

+Saturation

Conditions as indicated in Table 4a.
The kinetic index has a value of 0.94.

EXAMPLE 5

Production of Magnesium-Silicate Bound Zeolite Granulates in the Potassium Form 12 kg of zeolite granulates according to Example 1C are placed in a column with a length of 1 meter, diameter of 0.2 meter, which is filled with a 0.5 M magnesium chloride solution. The exchanger column is connected in circuit with a heatable storage container. The total volume of the solution is 20 liters. The solution is recylced for 3 hours at 80 degrees C. The zeolite granulates are then washed with water and are then treated for 30 minutes at 60 degrees C. with 20 liters of a 1 molar potassium chloride solution. The zeolite granulates are then washed until the conductivity in the wash water is below 500 µS.

The zeolite granulates are dried in a drying cabinet at 110 degrees C. and are activated in a muffle furnace at 400 degrees C. They show the following adsorption properties:

TABLE 5a

| Molecule | Weight Percent | Temp. Degrees C. | Adsorption time min. | Partial Press. | Spec. loading l/min g* |
|---|---|---|---|---|---|
| $H_2O$ | 17.5 | 20 | 30 | 20 | 0.8 |
| $NH_3$ | 7.7 | 20 | 30 | 620 | 0.85 |
| $CH_3OH$ | 5.4 | 20 | 30 | 150 | 1.0 |
| $n-C_6H_{14}$ | 2.1 | 20 | 30 | 150 | 1.0 |
| $CO_2$ | 1.2 | 20 | 30 | 580 | 1.1 |

*(adsorbed gas is diluted with carrier air, indicated in liters gas mixture per minute and per gram zeolite).

The kinetics of the water uptake are shown in Table 5b.

TABLE 5b

| Adsorption time | min. | 10 | 20 | 30 | 60 | 120 | 600+ |
|---|---|---|---|---|---|---|---|
| Water uptake | percent | 8.4 | 13.7 | 17.5 | 20.9 | 21.5 | 22.2 |

+Saturation

Conditions as indicated in Table 5a.
The kinetic index has a value of 0.79.

EXAMPLE 6

Production of Magnesium-Silicate Bound Zeolite Granulates in the Sodium Form 12 kg of zeolite granulates according to Example 1 are placed in a column with a length of 1 meter, diameter of 0.2 meter, which is filled with a 0.5 magnesium chloride solution. The exchanger column is connected in circuit with a heatable storage container. The total volume of the solution is 20 liters. The solution is recycled for 3 hours at 80 degrees C. The zeolite granulates are then washed with water and are then treated for 2 hours at 60 degrees C. with 20 liters of a 1 molar sodium chloride solution. The zeolite granulates are washed until the conductivity in the wash water is below 500 µS. The zeolite granulates are then dried in a drying cabinet at 110 degrees C. and are activated in a muffle furnace at 450 degrees C. They show the following adsorption properties:

TABLE 6a

| Molecule | Weight Percent | Temp. Degrees C. | Adsorption time min. | Partial Press. | Spec. loading l/min g* |
|---|---|---|---|---|---|
| $H_2O$ | 24.4 | 20 | 30 | 20 | 0.8 |
| $NH_3$ | 13.2 | 20 | 30 | 620 | 0.85 |
| $CH_3OH$ | 17.9 | 20 | 30 | 150 | 1.0 |

TABLE 6a-continued

| Molecule | Weight Percent | Temp. Degrees C. | Adsorption time min. | Partial Press. | Spec. loading l/min g* |
|---|---|---|---|---|---|
| n-C$_6$H$_{14}$ | 3.3 | 20 | 30 | 150 | 1.0 |
| CO$_2$ | 13.8 | 20 | 30 | 580 | 1.1 |

*(adsorbed gas is diluted with carrier air, indicated in liters gas mixture per minute and per gram zeolite).

The kinetics of the water uptake are shown in Table 6b.

TABLE 6b

| Adsorption time min. | 10 | 20 | 30 | 60 | 120 | 600+ |
|---|---|---|---|---|---|---|
| Water uptake percent | 17.7 | 23.5 | 24.4 | 24.7 | 24.7 | 24.8 |

+Saturation

Conditions as indicated in Table 6a.
The kinetic index has a value of 0.98.

EXAMPLE 7

Production of Magnesium-Silicate Bound Zeolite Granulates in the Calcium Form 12 kg of zeolite granulates according to Example 1C. are placed in a column with a length of 1 meter, diameter of 0.2 meter, which is filled with a 0.5 M magnesium chloride solution. The exchanger column is connected in circuit with a heatable storage container. The total volume of the solution is 20 liters. The solution is recycled for 3 hours at 80 degrees C. The zeolite granulates are then washed with water and are then treated for 2 hours at 60 degrees C. with 20 liters of a 1 molar calcium solution. The zeolite granulates are then washed until the conductivity in the wash water is below 500 $\mu$S. The zeolite granulates thus activated in a muffle furnace at 500 degrees C. They show the following adsorption properties:

TABLE 7a

| Molecule | Weight Percent | Temp. Degrees C. | Adsorption time min. | Partial Press. | Spec. loading l/min g* |
|---|---|---|---|---|---|
| H$_2$O | 22.0 | 20 | 30 | 20 | 0.8 |
| NH$_3$ | 12.2 | 20 | 30 | 620 | 0.85 |
| CH$_3$OH | 18.9 | 20 | 30 | 150 | 1.0 |
| n-C$_6$H$_{14}$ | 13.5 | 20 | 30 | 150 | 1.0 |
| CO$_2$ | 16.4 | 20 | 30 | 580 | 1.1 |

*(adsorbed gas is diluted with carrier air, indicated in liters gas mixture per minute and per gram zeolite).

The kinetics of the water up take are shown in Table 7b.

TABLE 7b

| Adsorption time min. | 10 | 20 | 30 | 60 | 120 | 600+ |
|---|---|---|---|---|---|---|
| Water uptake percent | 12.7 | 19.5 | 22.0 | 23.3 | 23.2 | 23.4 |

+Saturation

Conditions as indicated in Table 7a.
The kinetic index has a value of 0.94.

EXAMPLE 8

Drying of Solvents

One liter of ethanol with a water content of 1000 ppm was treated with 100 g of zeolite granulates according to Example 5 at room temperature in a flask. After 24 hours the ethanol had a residual water content of 20 ppm.

EXAMPLE 9

Use in Pipe Filters

In a smoking test with four test smokers, the zeolite granulate of the invention according to Example 4 was used in tobacco pipe filters and was compared with known activated charcoal filters. The test smokers were of the unanimous opinion that the filters equipped with the zeolite granulates according to the invention produced a more refreshing and more pleasant smoking enjoyment. The shape of the filter may be any convenient shaped form.

Further variations and modifications of the invention will be apparent to those skilled in the art from the foregoing description and are intended to be encompassed by the claims appended hereto. The entire disclosure of the German priority application No. P 33 12 877.4 is incorporated and relied on herein. All prior art documents identified above are incorporated herein.

We claim:

1. Magnesium-silicate bound zeolite granulates, comprising zeolite dispersed in a silicate binder, the binder having contained a cation which is essentially completely replaced by magnesium, wherein the zeolite does not contain magnesium exclusively as the cation, or is magnesium free.

2. The magnesium-silicate bound zeolite granulates of claim 1 further comprising the binder is sodium silicate wherein the sodium ions are essentially completely exchanged by magnesium.

3. The magnesium-silicate bound zeolite granulates of claim 1 further comprising wherein the zeolite has a portion of its cation exchanged by a different cation.

4. The magnesium-silicate bound zeolite granulates of claim 1 further comprising the zeolite having sodium at its cation.

5. The magnesium-silicate bound zeolite granulates of claim 1 further comprising the sodium cation of the zeolite having been partially replaced by a different cation.

6. The magnesium-silicate bound zeolite granulates of claim 3 further comprising the cation of the zeolite partially exchanged by a different cation capable of penetrating into the zeolite lattice.

7. The magnesium-silicate bound zeolite granulates of claim 3 further comprising the cation of the zeolite partially exchanged by a metal ion selected from the group of potassium, sodium, silver, calcium, barium and zinc.

8. The magnesium-silicate bound zeolite granulates of claim 1 which contain as the zeolite a magnesium-sodium zeolite A having the following adsorption data and a kinetic index for water of at least 0.8:

| Molecule | Weight Percent | Temp. Degrees C. | Adsorption time min. | Partial Press. | Spec. loading l/min g* |
|---|---|---|---|---|---|
| H$_2$O $\geq$ | 22 | 20 | 30 | 20 | 0.8 |
| NH$_3$ $\geq$ | 10 | 20 | 30 | 620 | 0.85 |
| CH$_3$OH $\geq$ | 15 | 20 | 30 | 150 | 1.0 |
| CO$_2$ $\geq$ | 8 | 20 | 30 | 150 | 1.0 |
| n-Hexane $\geq$ (C$_6$H$_{14}$) | 4 | 20 | 30 | 580 | 1.1 |

*(adsorbed gas is diluted with carrier air, indicated in liters gas mixture per minute and per gram zeolite).

9. The magnesium-silicate bound zeolite granulates of claim 1 which contain as the zeolite a potassium zeolite A having the following adsorption data and a kinetic index of at least 0.7:

| Molecule | Weight Percent | Temp. Degrees C. | Adsorption time min. | Partial Press. | Spec. loading l/min g* |
|---|---|---|---|---|---|
| $H_2O \geq$ | 21 | 20 | 30 | 20 | 0.8 |
| $NH_3 \geq$ | 7 | 20 | 30 | 620 | 0.85 |
| $CH_3-OH \geq$ | 6 | 20 | 30 | 150 | 1.0 |
| $CO_2 \geq$ | 2 | 20 | 30 | 150 | 1.0 |
| n-Hexane $\geq$ | 3 | 20 | 30 | 580 | 1.1 |

*(adsorbed gas is diluted with carrier air, indicated in liters gas mixture per minute and per gram zeolite).

10. The magnesium silicate-bound zeolite granulates of claim 1 which contain as the zeolite a sodium zeolite A having the following adsorption data and a kinetic index for water of at least 0.8:

| Molecule | Weight Percent | Temp. Degrees C. | Adsorption time min. | Partial Press. | Spec. loading l/min g* |
|---|---|---|---|---|---|
| $H_2O \geq$ | 24 | 20 | 30 | 20 | 0.8 |
| $NH_3 \geq$ | 10 | 20 | 30 | 620 | 0.85 |
| $CH_3-OH \geq$ | 15 | 20 | 30 | 150 | 1.0 |
| $CO_2 \geq$ | 10 | 20 | 30 | 150 | 1.0 |
| n-Hexane $\geq$ | 4 | 20 | 30 | 580 | 1.1 |

*(adsorbed gas is diluted with carrier air, indicated in liters gas mixture per minute and per gram zeolite).

11. The magnesium-silicate bound zeolite granulates of claim 1 which contain as the zeolite a calcium zeolite A having the following adsorption data and kinetic index for water of at least 0.8:

| Molecule | Weight Percent | Temp. Degrees C. | Adsorption time min. | Partial Press. | Spec. loading l/min g* |
|---|---|---|---|---|---|
| $H_2O \geq$ | 22 | 20 | 30 | 20 | 0.8 |
| $NH_3 \geq$ | 10 | 20 | 30 | 620 | 0.85 |
| $CH_3-OH \geq$ | 15 | 20 | 30 | 150 | 1.0 |
| $CO_2 \geq$ | 14 | 20 | 30 | 150 | 1.1 |
| n-Hexane $\geq$ | 12 | 20 | 30 | 580 | 1.1 |

*(adsorbed gas is diluted with carrier air, indicated in liters gas mixture per minute and per gram zeolite).

12. A process for the production of the magnesium-silicate bound zeolite granulates comprising mixing powdered zeolite A containing a cation with an alkali metal silicate binder solution until zeolite granulates with a grain size of at least 0.1 mm are obtained, treating the zeolite granulates thus obtained with an aqueous magnesium salt solution to thereby exchange the alkali metal of the said silicate binder with magnesium ions and permitting the exchanged alkali metal ions of the silicate binder to remain in the solution of magnesium salt whereby complete exchange of the cation in the zeolite is prevented, to thereby obtain magnesium-silicate bound zeolite granulates wherein the zeolite contains no magnesium or wherein only a portion of the cations of the zeolite are replaced by magnesium.

13. The process of claim 12 further comprising rolling the zeolite granulates after they are formed.

14. The process of claim 12 further comprising initially drying the zeolite granulate.

15. The process of claim 14 further comprising drying at a temperature of about 20 to 39 degrees C.

16. The process of claim 14 further comprising drying in air where the carbon dioxide content is less than 200 ppm.

17. The process of claim 12 further comprising a second drying step.

18. The process of claim 17 further comprising a second drying step at 40 to 120 degrees C.

19. The process of claim 17 further comprising a third drying step.

20. The process of claim 19 further comprising a third drying step at 121 to 200 degrees C.

21. The process of claim 12 further comprising activating the zeolite granulate by heating to a temperature of no more than 600 degrees C.

22. The process of claim 12 further comprising thereafter washing the magnesium salt treated zeolite granules.

23. The process of claim 12 further comprising treating the zeolite granulate with a second aqueous salt solution.

24. The process of claim 23 further comprising thereafter washing.

25. The process of claim 24 further comprising drying.

26. The process of claim 25 further comprising drying at 40 to 200 degrees C.

27. The process of claim 26 further comprising drying at 100 to 120 degrees C.

28. The process of claim 25 further comprising calcining.

29. The process of claim 28 further comprising calcining at 300 to 650 degrees C.

30. The process of claim 28 further comprising calcining at 300 to 600 degrees C.

31. The process of claim 30 further comprising calcining at 400 to 450 degrees C.

32. The process of claim 12 further comprising washing to zeolite granulates obtained after treatment with the aqueous magnesium salt solution, and then treating with an aqueous potassium salt solution, washing, and drying.

33. The process of claim 32 further comprising calcining at 300 to 550 degrees C.

34. The process of claim 33 further comprising calcining at 350 to 450 degrees C.

35. The process of claim 12 further comprising washing the zeolite granulates obtained after treated with the aqueous magnesium salt solution, and then treating with an aqueous sodium salt solution, washing and drying.

36. The process of claim 35 furthor comprising calcining at 300 to 600 degrees C.

37. The process of claim 36 further comprising calcining at 400 to 500 degrees C.

38. The process of claim 12 further comprising washing zeolite granulates obtained after treatment with the aqueous magnesium salt solution, and then treating with an aqueous calcium salt solution, washing and drying.

39. The process of claim 38 further comprising calcining at 300 to 650 degrees C.

40. The process of claim 39 further comprising calcining at 450 to 600 degrees C.

41. Magnesium-silicate bound zeolite granulates comprising zeolite dispersed in a silicate binder, the binder having contained a cation which is essentially completely replaced by magnesium and wherein the zeolite is magnesium free, said granulates having been produced by reacting silicate bound zeolite A with an aqueous magnesium salt.

42. Magnesium-salt bound zeolite granulates comprising zeolite dispersed in the silicate binder, the binder having contained a cation which is essentially completely replaced by magnesium, the zeolite being a metal alumino silicate, the metal of which is only partially replaced by magnesium, said granulates having been produced by reacting silicate bound zeolite A with an aqueous magnesium salt.

* * * * *